May 21, 1940.  E. SCHNURPFEIL  2,201,795

AUTOMATIC TRAFFIC SIGNAL DEVICE

Filed Aug. 8, 1938

Inventor
Erwin Schnurpfeil
by J Daniel Stuwe
Attorney.

Patented May 21, 1940

2,201,795

UNITED STATES PATENT OFFICE 2,201,795

AUTOMATIC TRAFFIC SIGNAL DEVICE

Erwin Schnurpfeil, Chicago, Ill.

Application August 8, 1938, Serial No. 223,573

3 Claims. (Cl. 200—59)

This invention relates to an improved automatic traffic signal device.

One of the main objects of this invention is to provide an efficient and economically constructed signal switch device which is more particularly adapted for controlling the direction signaling mechanism of an automobile or other conveyance.

Another object of this invention is to provide such a switch device which is automatically actuated by the turning of the steering wheel, for indicating the turn intended to be made with the automobile; and which furthermore includes additional switch means adapted to be operated by hand, whereby the signal device may furthermore be actuated prior to the turning of the steering wheel and independently thereof.

Another object of this invention is to provide an improved signal lamp to be mounted on the top of the automobile, and which alone will serve to provide all the signaling means formerly provided by the several customary front and rear lamps combined.

These and various other objects and advantages are attained with this invention, as will become apparent from the following description, taken in connection with the accompanying drawing in which this invention is illustrated in its preferred form of construction; it being understood that various other arrangements and forms of construction may be resorted to for carrying out the objects and purposes of this invention.

Figure 2:
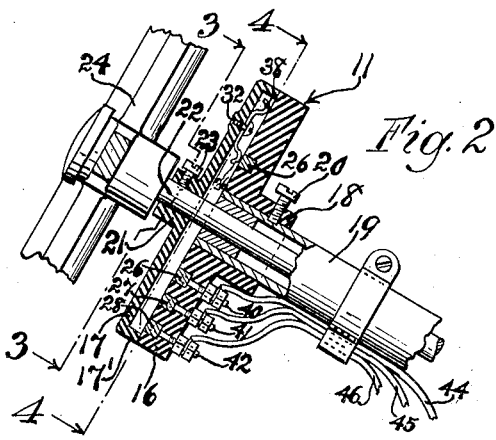
Fig. 2 is a sectional view of the switch device, shown applied to the steering mechanism of an automobile.
Figure 3:
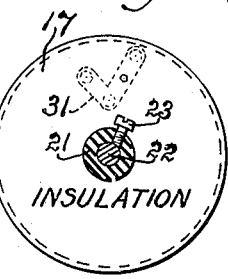
Figure 4:
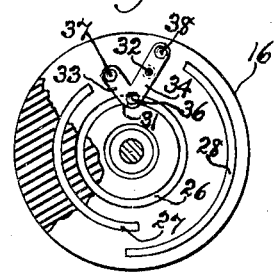

Figs. 3 and 4 are views taken respectively, along lines 3—3 and 4—4 of Fig. 2, showing the movable and the stationary insulating members of the switch.

Figure 1:
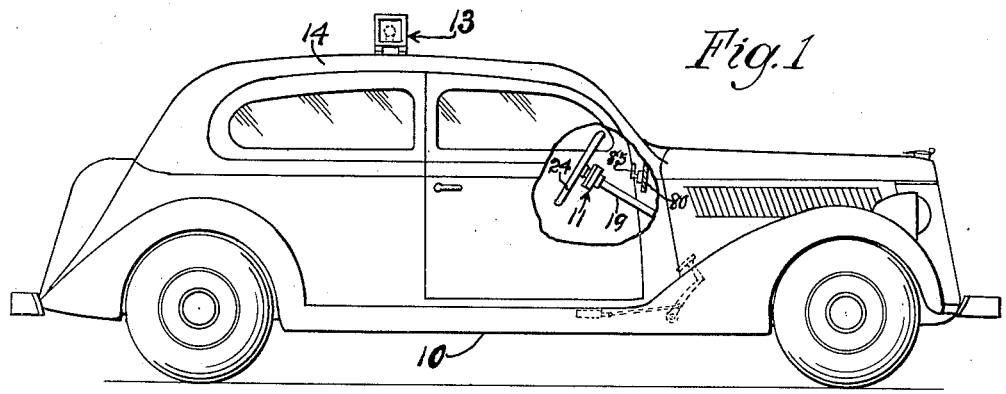
Fig. 1 shows an automobile in side elevation, having my invention applied thereto.
Figure 5:
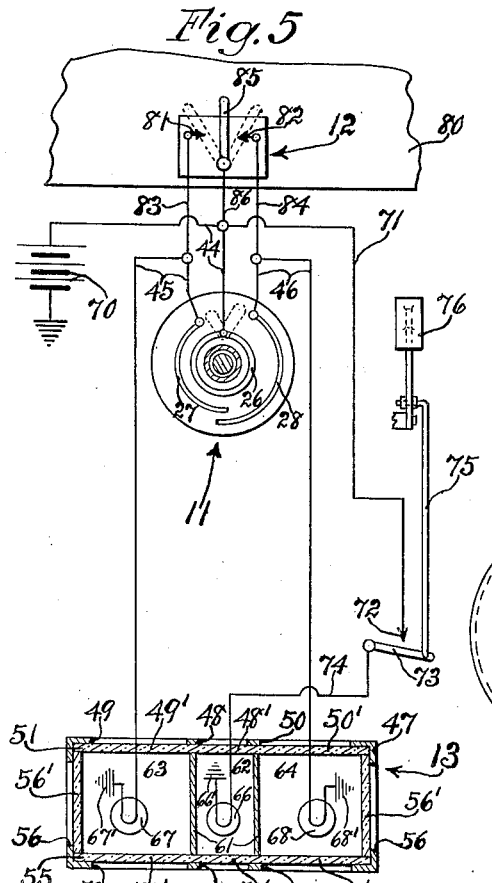

Fig. 5 is a diagrammatic view of the invention with its electric circuits, as applied to an automobile, the signal lamp being shown in horizontal section.

Figure 6:
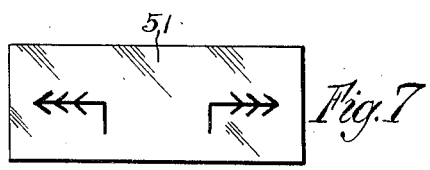

Fig. 6 is a perspective view of the signal lamp, from the rear and the right-hand side.

Figure 7:
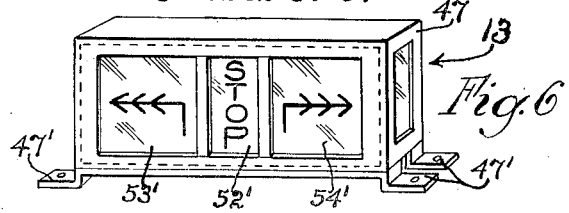

Fig. 7 is a view of the front panel of said lamp.

For the purpose of illustration my invention is shown herein as applied to an automobile 10; and its main feature consists of the improved automatic switch device 11, which is preferably accompanied by the manually actuated switch device 12, either of which functions to operate the novel signal lamp 13, said lamp being preferably mounted on an intermediate part of the top 14 of the automobile, so that the indicated signal can be readily observed from the front and from the rear and from either side thereof.

The automatic switch 11 is arranged and constructed in a very simple and compact manner, so that it can be made economically and can be placed on the market at a very reasonable price. It consists of two companion members 16 and 17, which are of insulating material and are substantially in the form of superposed disks. The member 16 has a collar 18 embracing the steering column 19 and secured thereto by a suitable element 20, so as to remain stationary therewith. The member 17 has a collar 21 embracing the steering post 22 and secured thereto by a suitable element 23, so as to turn with the post whenever it is actuated by the steering wheel 24.

The stationary switch member 16 has contacts 26, 27 and 28 secured thereon, which are preferably made of strips of brass or copper. Said contact strips are preferably curved and placed concentric on said member, and the inner contact 26 is substantially circular, while the intermediate contact 27, for indicating the left turn, and the outer contact 28, for indicating the right turn, are substantially semi-circular, as best shown in Fig. 4.

The movable switch member 17 has a contact element 31 secured thereon, as by means of a screw 32. Said element is preferably bellcrank shaped including a shorter arm 33 and a longer arm 34, having a contact point 36 at the angle portion which is constantly in contact with and movable over the inner circular contact strip 26; while arms 33 and 34 have contact points 37 and 38 at their ends adapted to be swung into engagement with and then to be slid upon the segmental strips 27 and 28, respectively, as the steering wheel and steering post are being turned, for indicating the left turn or the right turn. Said contact strips 26, 27 and 28 have binding posts 40, 41 and 42, respectively, extending therefrom thru insulating disk 16, which have conductors 44, 45 and 46 attached thereto, respectively, and extending therefrom along the steering column 19. Said member 17 may be provided with a peripheral flange 17', to provide a protective housing for the contact elements.

The signal lamp 13 is also arranged and constructed and is so mounted that it will effect economy in its use, and it will serve the purpose of the several and various stop lamps and direction signal lamps heretofore customarily employed. This lamp is in the form of a rectangular casing 47 provided with bracket means 47' whereby to secure it on the top of the automobile, having window openings 48, 49 and 50 in its front wall, with a front panel 51 extending across the inner side thereof, thereby providing front windows 48', 49' and 50'; also having window openings 52, 53 and 54 in its rear wall, with a panel 55 extending across the inner side thereof, thereby providing three rear windows 52', 53' and 54'. The outer windows 53' and 54' have outwardly directed arrows thereon for indicating a left turn and a right turn of the conveyance, and the central window 52' has the word "Stop" thereon for a stop signal. A window opening 56 is provided in each side of the casing 47 and has a panel 56' extending across the same, thus providing side windows. The panels are preferably of suitably colored glass.

Partitions walls 61 are placed across the casing, thereby providing a central chamber 62, and two outer chambers 63 and 64, which are provided, respectively, with light bulbs 66, 67 and 68, which are grounded on said casing at 66', 67' and 68', as best shown in Fig. 5.

The conductor 45 from the left-turn switch element 27 is connected with bulb 67, while the conductor 46 from the right-turn switch element 28 is connected with bulb 68. The conductor 44 is connected with the battery 70 of the automobile, and it has a branch conductor 71 extending to a stationary switch element 72 cooperating with a movable switch element 73 which is connected by a conductor 74 with the light bulb 66. Switch element 73 is moved to element 72 by a link 75 thru the operation of the foot pedal 76, for closing the circuit from the battery 70 thru conductor 44, conductor 71, elements 72 and 73, conductor 74, and thru bulb 66 and its ground 66' thru the automobile back to the battery, to energize the stop light by means of the foot pedal 76.

When the steering wheel 24 and post 22 are turned toward the right, in turning the automobile, the movable switch member 17 with contact element 31 are turned to the right so that contact point 38 engages and slides upon contact strip 28, while contact point 36 slides upon contact strip 26, and the circuit is thereby completed from battery 70 thru conductor 44, strip 26, arm 34, point 38, strip 28, conductor 46, and thru bulb 68 and its ground 68' thru the automobile back to the battery, thereby illuminating the chamber 64 to indicate a right-hand turn thru the windows 50', 56' and 54'. Likewise, when the steering wheel and the post are turned toward the left, the member 17 with element 31 are moved to the left and contact point 37 rides upon contact strip 27, while contact point 36 rides upon contact strip 26, thereby completing the circuit from battery 70 thru conductor 44, strip 26, arm 33, point 37, strip 27, conductor 45, and thru bulb 67 and its ground 67' thru the automobile back to the battery, thereby illuminating the chamber 63 to indicate a left-hand turn thru its front window 48', side window 56' and rear window 53', thus indicating from three directions of the signal device the turn intended to be made.

The means 12 which is provided for actuating the turn indicating signal manually, and prior to the turning of the steering mechanism and independently thereof, is preferably mounted on the dash board 80 of the automobile and includes stationary contact points 81 and 82 which are connected thru conductors 83 and 84, respectively, with the conductors 45 and 46, and therethru with the contact strips 27 and 28. A movable contact arm 85 on said means 12 is connected thru a conductor 86 with conductor 44 and therethru with contact strip 26. By moving arm 85 to the right, into engagement with contact point 82, the circuit is closed from battery 70 thru conductor 44, conductor 86, contacts 85 and 82, conductor 84, conductor 46, and thru bulb 68 and its ground 68' thru the automobile back to the battery. Likewise, when arm 85 is turned to the left into contact with element 81, the circuit is closed from battery 70 thru conductor 44, conductor 86, contacts 85 and 81, conductor 83, conductor 45, and thru bulb 67 and its ground 67' thru the automobile back to the battery, thereby illuminating the left-turn lamp to indicate a left-hand turn. This can thus be accomplished prior to the turning of the steering wheel, to give an advance signal if desired, and it can likewise be operated when the automobile and the steering wheel stand still.

It is apparent from the above disclosure that this invention, including the signal control switch 11 as well as the signal lamp 13, is very compact and economically constructed and fully serves the purpose of the more expensive and complex signal devices of this kind heretofore in use.

I claim:

1. An electric signal switch comprising two companion disk-like members of insulating material adapted to be mounted one on a column and the other on a post rotary in the column, one member having a collar and means for securing it to the column, concentrically arranged curved metal strips secured in the face of one member and having binding posts extending therefrom thru the member to its opposite face, adapted to have a conductor fastened on each binding post, the other member having a collar and means for securing it to said rotary post to turn therewith, and a contact element with resilient arms and including a contact point in engagement with the inner curved strip also contact points on said arms selectively engageable with either one of the other contact strips upon turning of said rotary post.

2. An electric switch comprising two superposed disk-like members of insulating material adapted to be mounted on a pair of companion supporting means one of which has rotary movement relative to the other, said switch members having means for securing them operatively to said pair of supporting means, one member including circularly arranged metal contact strips embedded in its face and having binding posts extending therefrom thru the member to its outer face, adapted to have conductors attached thereto, and the other member carrying a contact element on its inner face having a common contact point in constant engagement with one of said contact strips and also having two branch contact points each engageable respectively with one of the other contact strips upon turning of said member with its attached supporting means.

3. An electric signal switch comprising two superposed disk-like members of insulating material adapted to be mounted one on a column and the other on a steering post turnable in said column, each member having a collar on its outward face provided with securing means for readily securing one member onto the column and the other member onto the post, concentrically arranged curved metal strips embedded in the inward face of one member and having binding posts extending therefrom thru the member to its outward face, adapted to have a conductor fastened to each binding post, and the other member carrying a contact element on its inward face having a common contact point in constant engagement with one of said contact strips and also having two arms with contact points each engageable respectively with one of the other contact strips upon turning of said member with its attached steering post, one of these members containing a peripheral flange which bears on the other member thus providing a protective housing for the contact elements and strips.

ERWIN SCHNURPFEIL.